United States Patent Office 3,077,486
Patented Feb. 12, 1963

3,077,486
3-ALKENYL ETHERS OF 17α-HYDROCARBONYL-17β-ESTRADIOLS
Max N. Huffman, Colorado Springs, Colo., assignor to Lasdon Foundation, Inc., Yonkers, N.Y., a corporation of Delaware
No Drawing. Filed Mar. 16, 1962, Ser. No. 180,359
5 Claims. (Cl. 260—397.5)

This invention relates to novel steroid ethers and more particularly to 3-alkenyl ethers of 17β-estradiol compounds containing a lower aliphatic hydrocarbon substituent in the 17α-position, and to methods of producing such steroids. More particularly, the invention pertains to compounds having the following general formula:

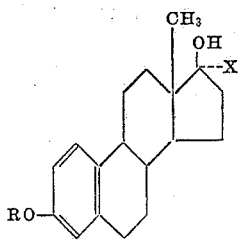

wherein R represents a lower alkenyl radical containing 2 to 5 carbon atoms and X represents a lower aliphatic hydrocarbon radical containing 1 to 5 carbon atoms.

In the compounds of the general structural formula set forth above, R represents lower alkenyl radicals such as crotyl, allyl, methallyl, and 2-pentenyl, while the substituent X represents lower aliphatic hydrocarbon radicals, such as methyl, ethyl, propyl, n-butyl, isobutyl, n-amyl and isoamyl, as well as unsaturated aliphatic hydrocarbon radicals, such as vinyl, ethynyl, allyl, methallyl, 3-butenyl and 2-pentenyl.

The compounds of this invention are useful in the prevention and suppression of schizophrenic behavior induced in mammals by lysergic acid diethylamide (LSD). The peculiar psychic action of LSD was discovered by A. Hofmann and W. A. Stoll (Schweizer Achiv fur Neurolgie and Psychiatrie, volume 60, page 279, 1947). Stoll showed that LSD produced an intoxication of the acute exogenous reaction type (as classified in psychic disease) in human beings when administered by mouth at the astonishingly small dose of 20 to 30 micrograms.

G. Condrau demonstrated that schizophrenic subjects are much more resistant to the action of LSD than normal persons, and that the tolerance to LSD seemed as a rule better in psychopaths than in healthy individuals (Acta Psychiatrica et Neurologica Scandinavica, volume 24, page 9, 1949). Condrau raised the question whether psychoses might not have their etiology in the endogenous production of substances similar to LSD. Other investigators believe that LSD intoxication is an especially suitable psychosis model of schizophrenia (R. Fisher, F. Georgi, and R. Weber, Schweizerische Medizinische Wochenschrift, volume 81, page 817, 1951).

D. W. Woolley has demonstrated that LSD also produces abnormal behavior in mice (Proceedings of the National Academy of Science, volume 41, page 338, 1955). This was also demonstrated for rats by C. A. Winter and L. Flataker, who designed a bioassay for quantitation of antagonistic effects of drugs on the psychic action produced by LSD in rats (Proceedings of the Society for Experimental Biology and Medicine, volume 92, page 285, 1956). Using this bioassay, J. R. Bergen, D. Krus and G. Pincus demonstrated that certain steroid hormones and metabolites had biological activity in suppressing LSD-induced behavior changes in rats. Estradiol-17β, however, was not effective (Proceedings of the Society for Experimental Biology and Medicine, volume 105, page 254, 1960).

17α-methyl-17β-estradiol-3-allyl ether also is effective in suppressing the secretion of growth hormones by the pituitary gland.

It is an object of this invention to provide new and useful steroids which antagonize or suppress the induction of psychotic conditions by LSD in mammals. It is a further object to provide methods for producing such compounds by economical and efficient methods from readily available starting materials. It is a further object to produce novel estradiol compounds having useful physiological properties. These and other objects are apparent from and are achieved in accordance with the following disclosure.

The compounds of this invention are produced from alkenyl ethers of estrone by reaction with a suitable Grignard reagent or other organometallic compound of the formula XMg-halogen (wherein X has the meaning given above) in an inert solvent such as an aliphatic ether, dioxane, tetrahydrofuran, or an aliphatic hydrocarbon. By this reaction, a hydrocarbon substituent is introduced in the 17α-position and a hydroxyl group is formed in the 17β-position. This procedure is conducted at low temperatures (15–100° C.) and an excess of the organometallic compound is used to insure a substantially complete reaction of the 17-keto group with the organometallic substance. The steroid compound is isolated by decomposing the reaction mixture with aqueous acid or saturated ammonium chloride solution and isolating the steroid from the organic phase, as by extraction and evaporation.

The compounds of this invention, while having desirable physiological properties of suppressing the undesired effects of LSD, are relatively inactive as estrogens, so that they do not produce the undesired estrogenic activity of estradiol and its derivatives. Thus, these compounds differ from the estradiol compounds not only in the absence of estrogenic hormone effects but in their ability to suppress psychotic LSD effect, whereas estradiol is ineffective in this connection.

The estrone alkenyl ethers which are used as starting materials in the synthesis of the novel steroids of this application are produced from estrone by reaction with an alkenyl halide in the presence of an alkali which binds the elements of hydrohalic acid formed in the reaction. Typical is the reaction of estrone with allyl bromide to produce estrone allyl ether. The general synthesis is described by K. Miescher and C. Scholz, Helvetica Chimica Acta, volume 20, pp. 1237–1244 (1937).

The invention is disclosed in further detail by means of the following examples, which are provided for purposes of illustration only and are not intended to limit the invention in spirit or in scope. It will be apparent to those skilled in the art that numerous modifications in operating conditions and reagents can be made within the scope of this disclosure without departing from the invention.

EXAMPLE 1

*17α-Methyl-17β-Estradiol-3-Allyl Ether*

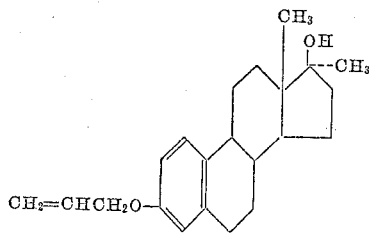

To a solution of 1 gram of estrone allyl ether in 100 ml. of anhydrous ether is added dropwise over 10 minutes 50 ml. of 3 M methylmagnesium bromide solution in ether. The mixture is refluxed for an hour, then decomposed with 400 ml. of ice water containing 20 ml. of concentrated hydrochloric acid and portioned with 500 ml. of ether. The ether phase is washed with water, dried and evaporated. The residue of 17α-methyl-17β-estradiol-3-allyl ether is recrystallized from aqueous methanol and from a mixture of ethyl acetate and heptane. It has a melting point of 110.5–111° C.

In a procedure similar to that given above, but using estrone crotyl ether in lieu of estrone allyl ether, there is produced 17α-methyl-17β-estradiol-3-crotyl ether, which has the formula

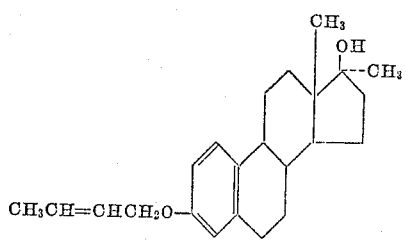

Similarly, using isoamylmagnesium bromide instead of methylmagnesium bromide, there is produced 17α-isoamyl-17β-estradiol-3-allyl ether, of the formula

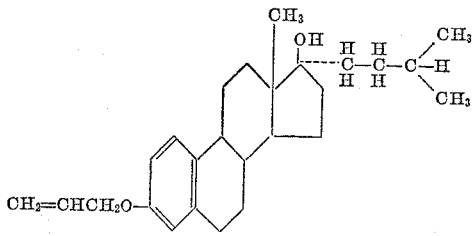

EXAMPLE 2

*17α-Allyl-17β-Estradiol-3-Allyl Ether*

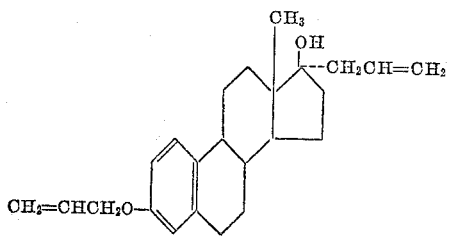

A solution of allylmagnesium bromide is prepared from 12.6 grams of magnesium and 60.5 grams of allyl bromide in 1000 ml. of anhydrous ether. To it is added, dropwise with stirring at a temperature not greater than 2° C., 6 grams of estrone allyl ether in 450 ml. of anhydrous ether over 2 hours. The reaction mixture is stirred at 0–2° C. for 2 hours and left at 22° C. for 16 hours. It is decomposed by addition to 1 liter of saturated ammonium chloride solution. The ether phase is separated, washed with water, dried and evaporated. The residue of 17α-allyl-17β-estradiol-3-allyl-ether is crystallized from a mixture of acetone, hexane and methanol and from methanol-hexane and melts at 65° C.

EXAMPLE 3

Estrone allyl ether is produced as follows: 100 mg. of sodium was dissolved in 5 ml. of absolute ethanol. Then 1.0 g. of estrone was dissolved in the solution, followed by 0.5 ml. of allyl bromide. The reaction mixture was heated to 80–85° C. for 1.5 hours, then evaporated to dryness in vacuum. The residue was dissolved in 50 ml. of ether and 50 ml. of water and the ether phase washed with 5% hydrochloric acid, 5% NaOH solution and with water. The ether phase was dried and evaporated and the residue of estrone allyl ether was recrystallized from aqueous ethanol; M.P. 108–109° C.

By analogous procedures the crotyl, methallyl, and 2-pentenyl ethers of estrone are produced from crotyl bromide, methallyl bromide and 1-bromo-2-pentene, respectively.

I claim:

1. A steroid of the formula

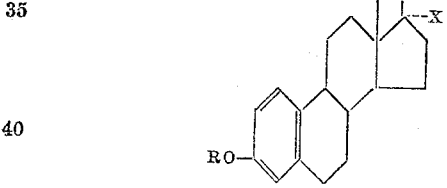

wherein R is a lower alkenyl radical and X is a lower aliphatic hydrocarbon radical, both radicals containing not more than 5 carbon atoms.

2. A steroid as defined by claim 1 wherein X is a lower alkenyl radical.

3. A steroid as defined by claim 1 wherein X is a lower alkyl radical.

4. 17α-methyl-17β-estradiol-3-allyl ether.

5. 17α-allyl-17β-estradiol-3-allyl ether.

References Cited in the file of this patent

UNITED STATES PATENTS

| | | |
|---|---|---|
| 2,243,887 | Serini et al. | June 3, 1941 |
| 2,843,608 | Colton | July 15, 1958 |
| 2,864,830 | Agnello et al. | Dec. 16, 1958 |